(12) United States Patent
Tang (10) Patent No.: US 10,750,276 B2
(45) Date of Patent: Aug. 18, 2020

(54) APPARATUS AND METHOD FOR SENSING AN ENVIRONMENT

(71) Applicant: Shanghai Xiaoyi Technology Co., Ltd., Shanghai (CN)

(72) Inventor: Mingyong Tang, Beijing (CN)

(73) Assignee: SHANGHAI XIAOYI TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 15/873,403

(22) Filed: Jan. 17, 2018

(65) Prior Publication Data

US 2019/0014408 A1    Jan. 10, 2019

(30) Foreign Application Priority Data

Jul. 4, 2017   (CN) .......................... 2017 1 0539481

(51) Int. Cl.
| | |
|---|---|
| *H04S 1/00* | (2006.01) |
| *H04R 1/32* | (2006.01) |
| *H04N 7/15* | (2006.01) |
| *H04N 7/14* | (2006.01) |
| *H04N 7/18* | (2006.01) |
| *G01S 5/18* | (2006.01) |
| *G06K 9/00* | (2006.01) |
| *H04R 1/40* | (2006.01) |
| *H04R 3/00* | (2006.01) |

(52) U.S. Cl.
CPC ............... *H04R 1/326* (2013.01); *G01S 5/18* (2013.01); *G06K 9/00362* (2013.01); *H04N 7/142* (2013.01); *H04N 7/15* (2013.01); *H04N 7/181* (2013.01); *H04R 1/406* (2013.01); *H04R 3/005* (2013.01); *G06T 2207/30196* (2013.01)

(58) Field of Classification Search
CPC .. G09G 5/003; G09G 2354/00; F16M 11/128; F16M 11/18
See application file for complete search history.

(56) References Cited

U.S. PATENT DOCUMENTS

| | | |
|---|---|---|
| 2005/0007445 A1 | 1/2005 | Foote et al. |
| 2005/0267605 A1 | 12/2005 | Lee et al. |
| 2007/0126873 A1 | 6/2007 | Xu et al. |

(Continued)

FOREIGN PATENT DOCUMENTS

| | | |
|---|---|---|
| CN | 101827244 A | 9/2010 |
| CN | 102333202 A | 1/2012 |

(Continued)

OTHER PUBLICATIONS

Extended European Search Report in counterpart European Patent Application No. 18181736.2 dated Nov. 9, 2018.

(Continued)

*Primary Examiner* — Amir H Etesam
(74) *Attorney, Agent, or Firm* — Cantor Colburn LLP (57) ABSTRACT

An apparatus includes a sensor for sensing an environment and a speaker. The apparatus also includes a display capable of displaying video information in multiple directions, wherein the display is configured to display video information in different directions based on information of an object sensed by the sensor. The speaker is configured to generate in multiple directions sound associated with the video information.

27 Claims, 10 Drawing Sheets

(56) References Cited

U.S. PATENT DOCUMENTS

| | | | |
|---|---|---|---|
| 2008/0036875 A1 | 2/2008 | Jones et al. | |
| 2010/0118112 A1 | 5/2010 | Nimri et al. | |
| 2010/0225736 A1 | 9/2010 | King et al. | |
| 2012/0075407 A1 | 3/2012 | Wessling | |
| 2015/0085065 A1 | 3/2015 | Sun et al. | |
| 2015/0110293 A1* | 4/2015 | Wiggins | H04R 1/023 381/103 |
| 2015/0185832 A1 | 7/2015 | Locker et al. | |
| 2015/0382124 A1* | 12/2015 | Hall | H04S 1/007 381/300 |
| 2017/0165843 A1 | 6/2017 | Lee et al. | |
| 2017/0278477 A1* | 9/2017 | Jeong | G06F 3/16 |
| 2017/0359671 A1* | 12/2017 | Eronen | H04H 60/04 |
| 2019/0086952 A1* | 3/2019 | Park | G09F 21/02 |

FOREIGN PATENT DOCUMENTS

| | | |
|---|---|---|
| CN | 102404545 A | 4/2012 |
| CN | 106707227 A | 5/2017 |

OTHER PUBLICATIONS

Yoichi Ochiai et al., "Holographic Whisper: Rendering Audible Sound Spots in Three-dimensional Space by Focusing Ultrasonic Waves", Proceedings of 2017 Chi Conf. on Human Factors in Computing Systems, Denver, CO, USA, May 6-11, 2017, pp. 4314-4325.
CNIPA First Office Action corresponding to CN201710539481.7 dated Feb. 3, 2020.

* cited by examiner

APPARATUS AND METHOD FOR SENSING AN ENVIRONMENT

CROSS-REFERENCE TO RELATED APPLICATION

This application is based upon and claims priority to Chinese Patent Application No. 201710539481.7, filed Jul. 4, 2017, the entire contents of which are incorporated herein by reference.

TECHNICAL FIELD

The present disclosure generally relates to apparatus and method for sensing, outputting, and displaying. More particularly, the present disclosure relates to apparatus and method for apparatus with a human-machine interface for sensing an environment by a sensor and displaying video information in multiple directions by a display based on information of an object sensed by the sensor.

BACKGROUND

Individuals and businesses communicate in real time between various locations by means of video-teleconferencing devices. Such devices may be used in settings where people and/or content are in motion. However, utilizing current technology, it may be challenging to capture one or more callers while in motion. In some settings, a user may require a device that captures video in multiple directions or a 360° field of view. Such a requirement may be partly possible by using a 360° camera, for example. However, merely using a 360° camera has shortcomings. While a 360° camera may be able to generate a panoramic image, it cannot capture video information in different directions based on information of an object sensed by a camera.

SUMMARY

One aspect of the present disclosure is directed to an apparatus including a sensor for sensing an environment and a speaker. The apparatus also includes a display capable of displaying video information in multiple directions, wherein the display is configured to display video information in different directions based on information of an object sensed by the sensor, and the speaker is configured to generate in multiple directions sound associated with the video information.

Another aspect of the present disclosure is directed to a method which includes sensing an environment by a sensor and generating an output by a speaker. The method also includes displaying video information in multiple directions by a display, wherein the display displays video information in different directions based on information of an object sensed by the sensor, and the speaker generates in multiple directions sound associated with the video information.

Yet another aspect of the present disclosure is directed to a non-transitory computer readable medium storing instructions that are executable, the instructions being configured to cause a processor to sense an environment by a sensor and to generate an output by a speaker. The instructions are also configured to cause the processor to display video information in multiple directions by a display, wherein the display displays video information in different directions based on information of an object sensed by the sensor, and the speaker generates in multiple directions sound associated with the video information.

DESCRIPTION OF DRAWINGS

Methods, systems, and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Reference will now be made in detail to the disclosed embodiments, examples of which are illustrated in the accompanying drawings. Wherever convenient, the same reference numbers will be used throughout the drawings to refer to the same or like parts.

Features and characteristics of the present disclosure, as well as methods of operation and functions of related elements of structure and the combination of parts and economies of manufacture, may become more apparent upon consideration of the following description with reference to the accompanying drawings, all of which form a part of this specification. It is to be understood, however, that the drawings are for the purpose of illustration and description only and are not intended as a definition of the limits of the invention. As used in the specification and in the claims, the singular form of "a", "an", and "the" include plural referents unless the context clearly dictates otherwise.

The embodiments described herein relate to systems including one or more of image, video, and audio capture and display, including systems capable of consuming 360° content. Many situations, ranging from activities such as teleconferencing to recreational activity at panoramic sites, are ideal for capturing this type of content.

According to some embodiments of the disclosure, an apparatus includes a sensor to sense an environment, a speaker to generate an output, and a display to display video information in multiple directions, wherein the display is configured to display video information in different directions based on information of an object sensed by the sensor. Accordingly, the apparatus may be used by a user to teleconference, monitor, or view in real time one or more images captured by the apparatus. For example, in accordance with an embodiment of the disclosure, video data can be captured in multiple directions even if the user is in motion while the apparatus is capturing the video data.

According to some embodiments, the apparatus can be configured to capture one or more images in a variety of ways. For example, the apparatus can be configured to capture images, in response to user input, by software or hardware programming, by hardware setting, or by a combination thereof. In some embodiments, when the apparatus is configured to capture images by software or hardware programming or by hardware setting, image capturing can be performed subject to one or more predetermined conditions. For example, a set of predetermined conditions can trigger the apparatus to capture images. Alternatively, or additionally, the apparatus can capture images in response to a user's operation. In some embodiments, capturing images may include placing the apparatus in a particular operating mode or controlling a setting of the apparatus to enable a capability to capture one or more images. In some embodiments, capturing images may include capturing one or more images. As used herein, an "image" refers to, in part or in whole, a static or dynamic visual representation including, but not limited to, a photo, a picture, a graphic, a video, a hologram, a virtual reality image, an augmented reality image, other visual representations, or a combination thereof. In additional embodiments, the systems and methods disclosed herein further include a processor executing software instructions to identify an event based on a sound or image received by the apparatus.

As used herein, the term "real time" refers to the display of an image or video at the same time as, or within a short time of, its capture (on the order of milliseconds or tens of milliseconds), so that the displayed image or video realistically displays a typical moving object, such as a teleconference user or a baby crawling.

The embodiments described herein can apply to many fields. Descriptions and applications related to specific domains do not preclude the application of the described embodiments to other technologies or fields.

Figure 1:
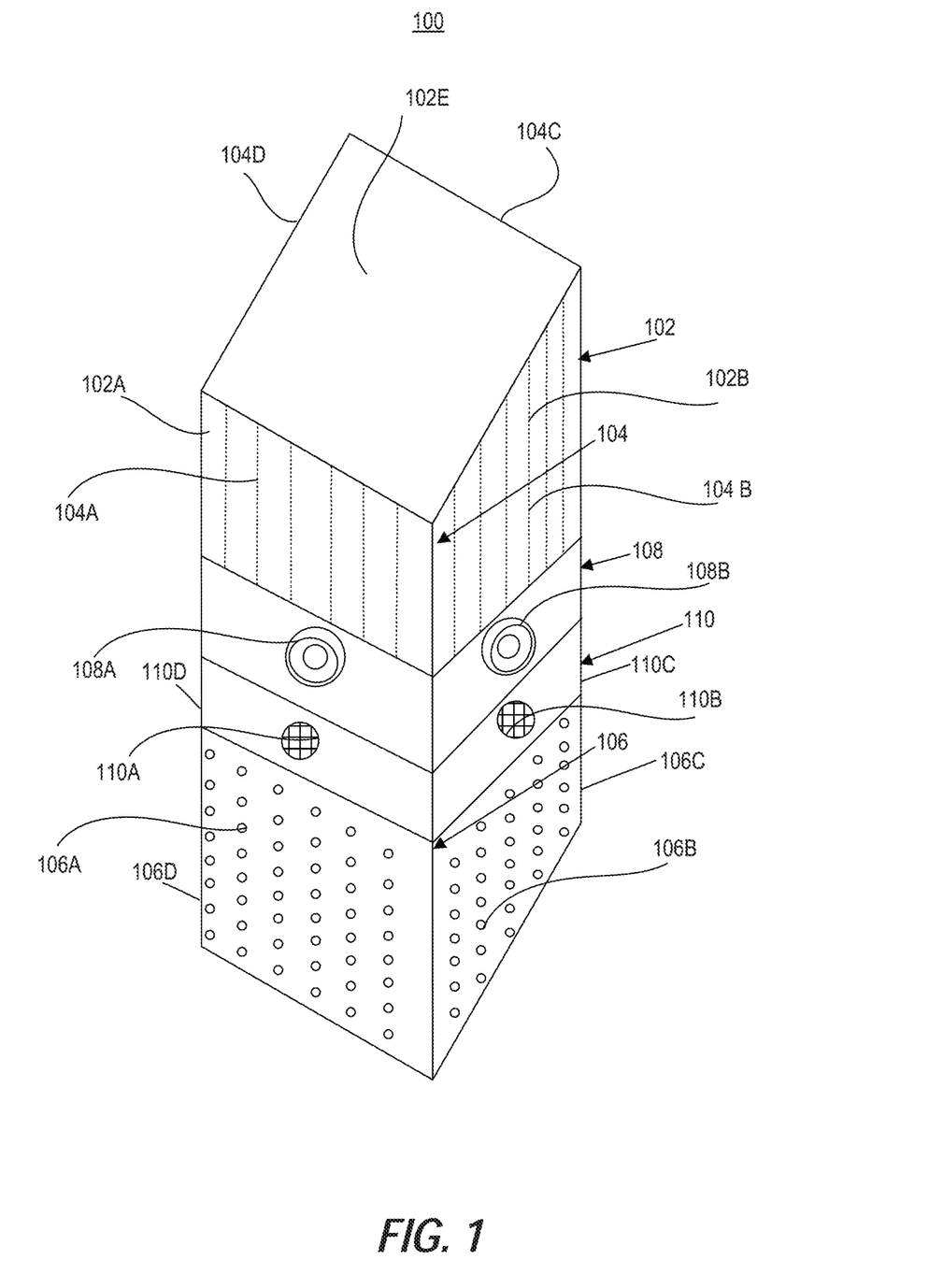
FIG. 1 is an exemplary perspective view of an apparatus according to an embodiment of the present disclosure.
Figure 2:
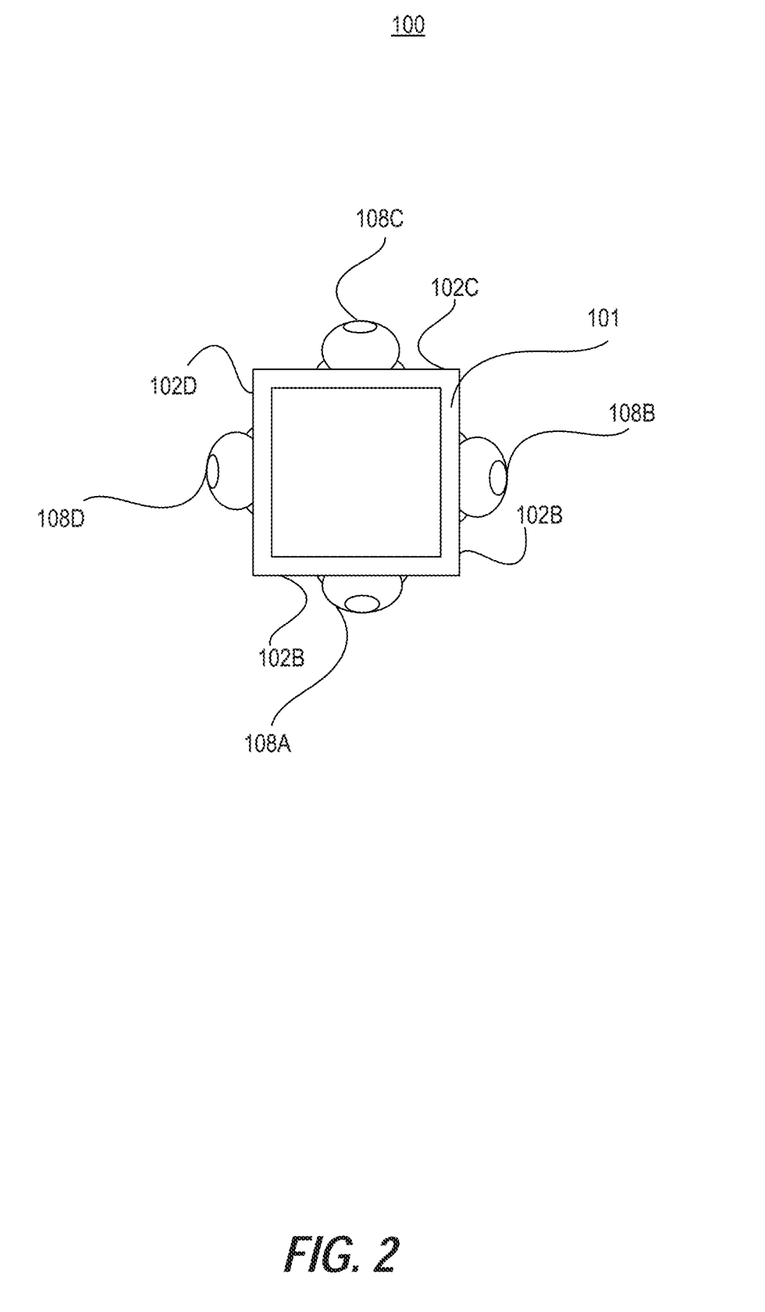
FIG. 2 is an exemplary top view of the apparatus shown in FIG. 1.

FIG. 1 is an exemplary perspective view of an apparatus 100 consistent with embodiments of the present disclosure. FIG. 2 is an exemplary top view of apparatus 100. As seen in FIGS. 1 and 2, apparatus 100 has a square or rectangular cross section. Apparatus 100 includes a sensor for sensing an environment, a speaker, and a display capable of displaying video information in multiple directions. In some embodiments, the sensor includes one or more audio detectors, image detectors, a combination of different sensors, or any other sensing mechanism. For example, the sensor can include one or more of a microphone, a camera, an ultrasound sensor, a gyroscope, an accelerometer, or any other sensing mechanism capable of sensing an environment. In some embodiments, one or more of the sensors can be configured to sense a person in the environment. The one or more sensors can sense information of the sensed person including voice, location relative to apparatus 100, commands, touches, and/or gestures of the person.

By way of example, apparatus 100 includes a housing 102 to hold a display 104, a speaker array 106, and sensors including a camera array 108, and a microphone array 110. Housing 102 has four lateral side surfaces 102A-D and a top surface 102E. Display 104 can include one display or multiple displays, for example displays 104A-D, on respective side surfaces 102A-D of housing 102, of which displays 104A and 104B are directly visible in FIG. 1 and displays 104C and 104D are on surfaces 102C and 102D of enclosure 102 not directly visible in FIG. 1. Camera array 108 includes cameras 108A-D. In some embodiment, cameras 108A-D may be configured to be mounted flush with lateral side surfaces 102A-D of housing 102, respectively. Microphone array 110 includes microphones 110A-D. In some embodiments, microphones 110A-D may be configured to be mounted on lateral side surfaces 102A-D of housing 102, respectively, of which microphone 110A and 110B are visible in FIG. 1. Speaker array 106 includes speakers 106A-D. In some embodiments, speakers 106A-D may be configured to be mounted on lateral side surfaces 102A-D of housing 102, respectively, of which speakers 102A and 102B are visible in FIG. 1.

In other embodiments, apparatus 100 is instead configured to have a cylindrical or spherical shape.

The display for displaying multiple images may wrap around the apparatus as do displays 104A-D of apparatus 100. In some embodiments consistent with the present disclosure, systems and methods may include more displays or as few as one display. By way of example, apparatus 100 may be placed at the center of a table. Users may sit on different sides of the table for a teleconference with a remote group of users. Each of the multiple displays may present the same image. The image may include the remote user that is speaking at that moment. Alternatively, each of the multiple displays may present a panoramic image including all remote users situated around remote apparatus. Further, the panoramic image received by the remote apparatus can split between each display of the apparatus. In another embodiment, the multiple images on the display can be still images or video of the remote group of users, or a user interface.

Cameras 108A-D of camera array 108 can be configured to capture video data and have a multi-directional view of the environment. Video frames respectively generated by captured images may be combined and stitched to create a virtual reality experience. The term "virtual reality" as used herein refers to technology that uses images, sounds, and other sensations to simulate an environment, e.g., a real environment or an imaginary setting. In other embodiments consistent with the present disclosure, the systems and methods can include more cameras or as few as one camera.

Each of cameras 108A-D may be a digital camera, a web camera, a fish-eye lens camera, or any camera with a multi-directional view of the environment. In some embodiments, cameras 108A-D of camera array 108 may further be configured to capture a video with a native resolution of 320×240, 426×240, 640×360, 480×360, 800×600, 852×640, 960×540, 1024×768, 1280×720, 1280×960, 1280×1024, 1440×1050, 1440×1080, 1600×1200, 1920×1080, 2560×1440, 3840×2160, 5120×2880, 7680×4320, or any other suitable resolution. It will be understood that the forgoing examples are representative of exemplary embodiments only. The disclosed systems and methods may be implemented to provide enhanced resolution that is greater than the native or standard resolution capability.

In some embodiments, each of microphones 110A-D of microphone array 110 can have directional pick-up fields corresponding to the fields of view of the cameras 108A-D, respectively. In other embodiments consistent with the present disclosure, system and methods can include more microphones or as few as one microphone. In some embodiments, the microphone detects voice in the environment and the direction of the voice.

In some embodiments, speakers 106A-D of speaker array 106 are multi-directional and each can be adjusted to play sound in different directions based on the information of the environment as sensed. In other embodiments consistent with the present disclosure, systems and methods can include more speakers or as few as one speaker.

By way of example, in some embodiments, apparatus 100 may generate local correlation information such that a remote user speaking may be displayed on display 104 while speakers 106A-D output audio generated from the remote microphones corresponding to the remote camera(s) directed to the remote user. Moreover, apparatus 100 may be configured to only capture the image and voice of the person who is currently speaking.

In one embodiment, apparatus 100 is configured as a conferencing apparatus for use by multiple callers. In such an embodiment, display 104 displays information of a remote participant, at a remote site, in the direction of a first caller, using apparatus 100 at a local site. The information of the remote participant includes an image of the remote participant, the remote participant's location, or video/image that the remote participant shares with the first caller. The first caller at the local site may be moving around apparatus 100. Apparatus 100 may be configured to capture a multi-directional view of the environment to follow the first caller's movement. In one embodiment, apparatus 100 can switch between cameras 108A-D, for example, which have overlapping fields of view. As the first caller moves, the apparatus may capture image, audio, and correlation information of the first caller at any location at the local site. The apparatus can transmit continuous audio and video data by covering a multi-directional view of the environment at the local site in both vertical and horizontal directions around apparatus 100. The display of an apparatus at the remote site may provide a continuous view of the moving first caller. The first caller does not need to adjust the physical orientation of apparatus 100 to transmit continuous video and audio data. Furthermore, the first caller that is moving at the local site may view or listen to the remote participant at the remote site without adjusting the local apparatus.

Figure 3:
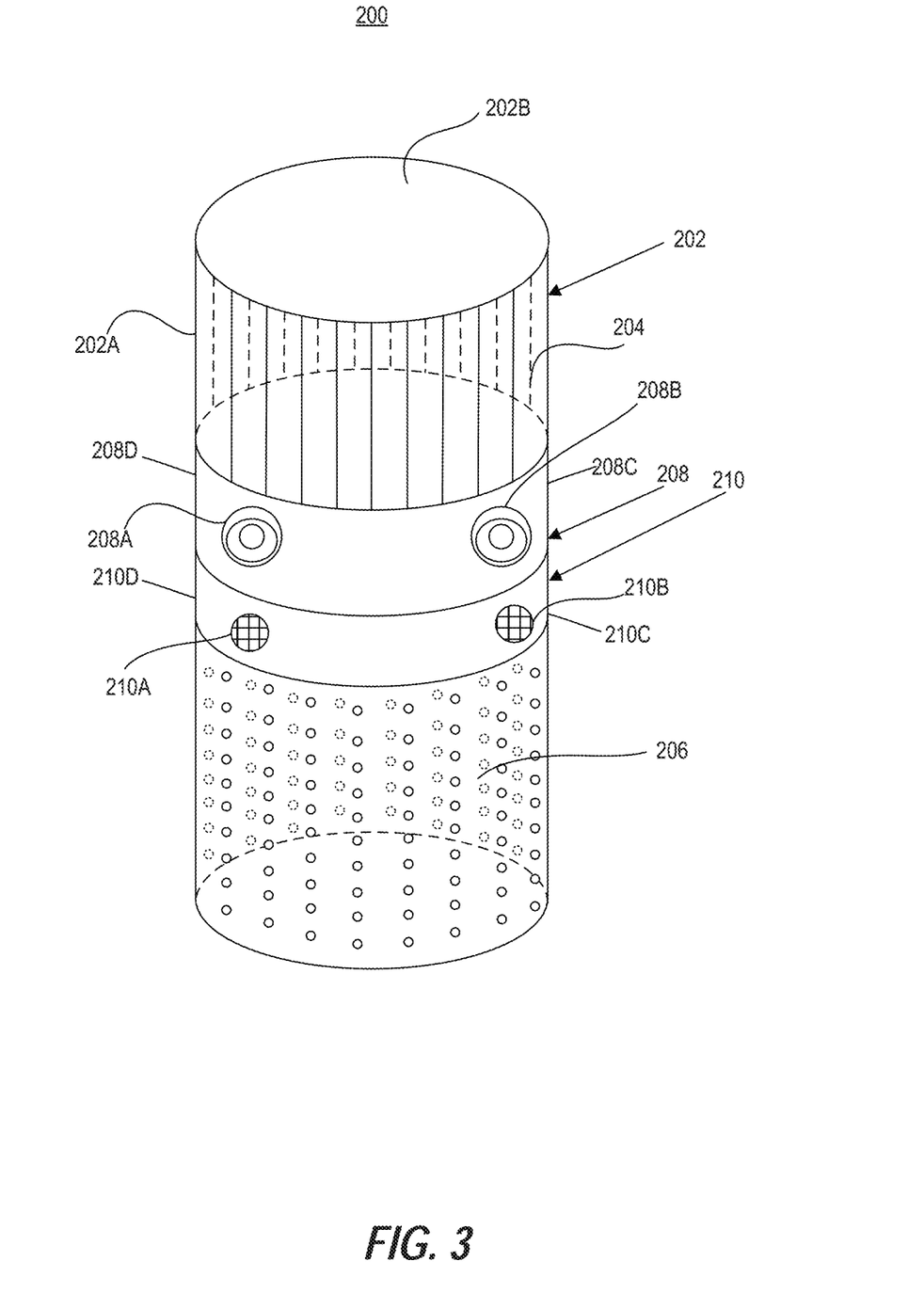
FIG. 3 is an exemplary perspective view of a curved apparatus according to an embodiment of the present disclosure.
Figure 4:
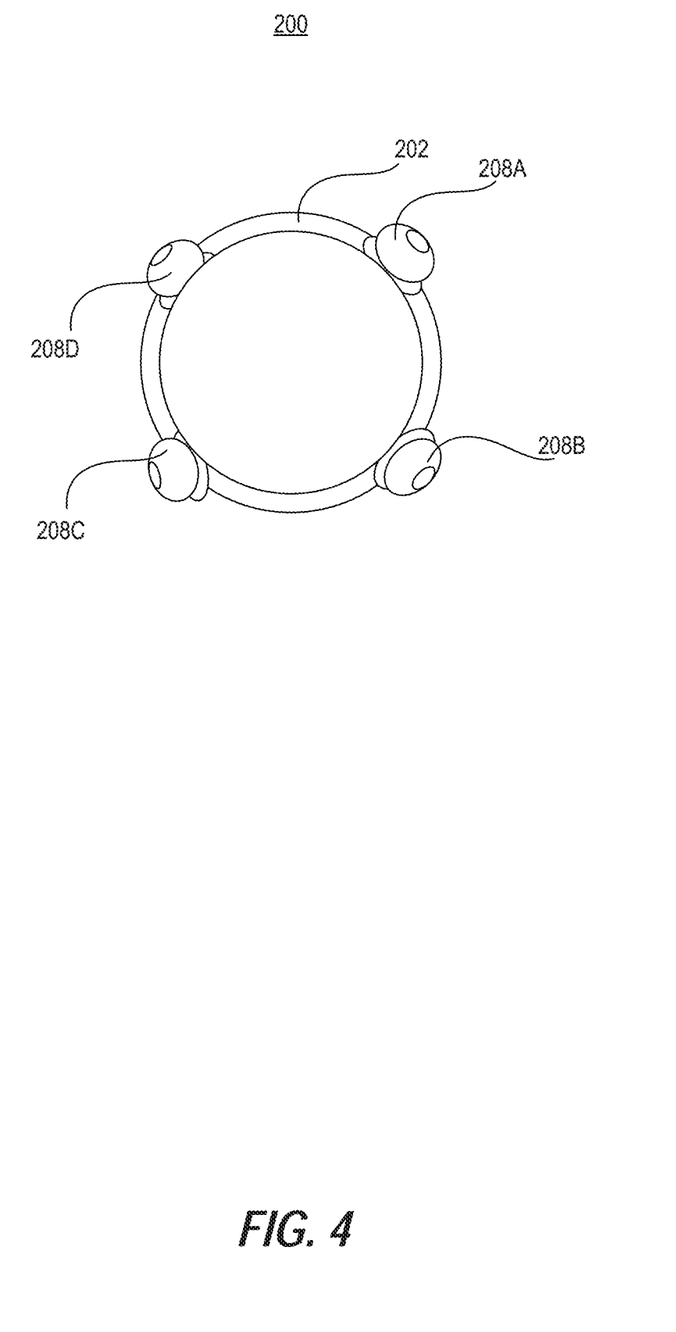
FIG. 4 is an exemplary top view of the curved apparatus shown in FIG. 3.

FIG. 3 is an exemplary perspective view of a curved apparatus 200 consistent with embodiments of the present disclosure. FIG. 4 is an exemplary top view of curved apparatus 200. As seen in FIGS. 3 and 4, apparatus 200 has a cylindrical shape including a housing 202 having a circular cross section and a curved surface. Apparatus 200 includes a curved display 204 mounted on the curved surface of housing 202. The curved display is suitable for displaying a wide-angle view or panoramic image, such as showing a virtual tour of a city or playing a movie. Apparatus 200 may be configured to recognize voice commands from a user and play a user-selected video or image on display 204.

By way of example, apparatus 200 includes curved display 204, a speaker array 206, and sensors including a camera array 208, and a microphone array 210. Housing 202 has a curved surface 202A and a top surface 202B. Curved display 204 can include one display or multiple curved displays on curved surface 202A of housing 202. Camera array 208 includes cameras 208A-D. In some embodiment, cameras 208A-D may be configured to be mounted flush with curved surface 202A of housing 202, of which cameras 208A and 208B are directly visible and cameras 208C and 208D are on the portion of curved surface 202A of enclosure 202 not directly visible in FIG. 3. Cameras 208A-D of camera array 208 are directly visible in exemplary top view of curved apparatus 200 in FIG. 4. Microphone array 210 includes microphones 210A-D. In some embodiments, microphones 210A-D may be configured to be mounted on curved surface 202A of housing 202, of which microphone 210A and 210B are visible and microphones 210C and 210D are on the portion of curved surface 202A of enclosure 202 not directly visible in FIG. 3. Speaker array 206 is provided as a continuous array of speakers around the circumference of curved surface 202A of housing 202, although speaker array 206 could instead be provided as, e.g., four discrete speakers distributed around housing 202.

Figure 5:
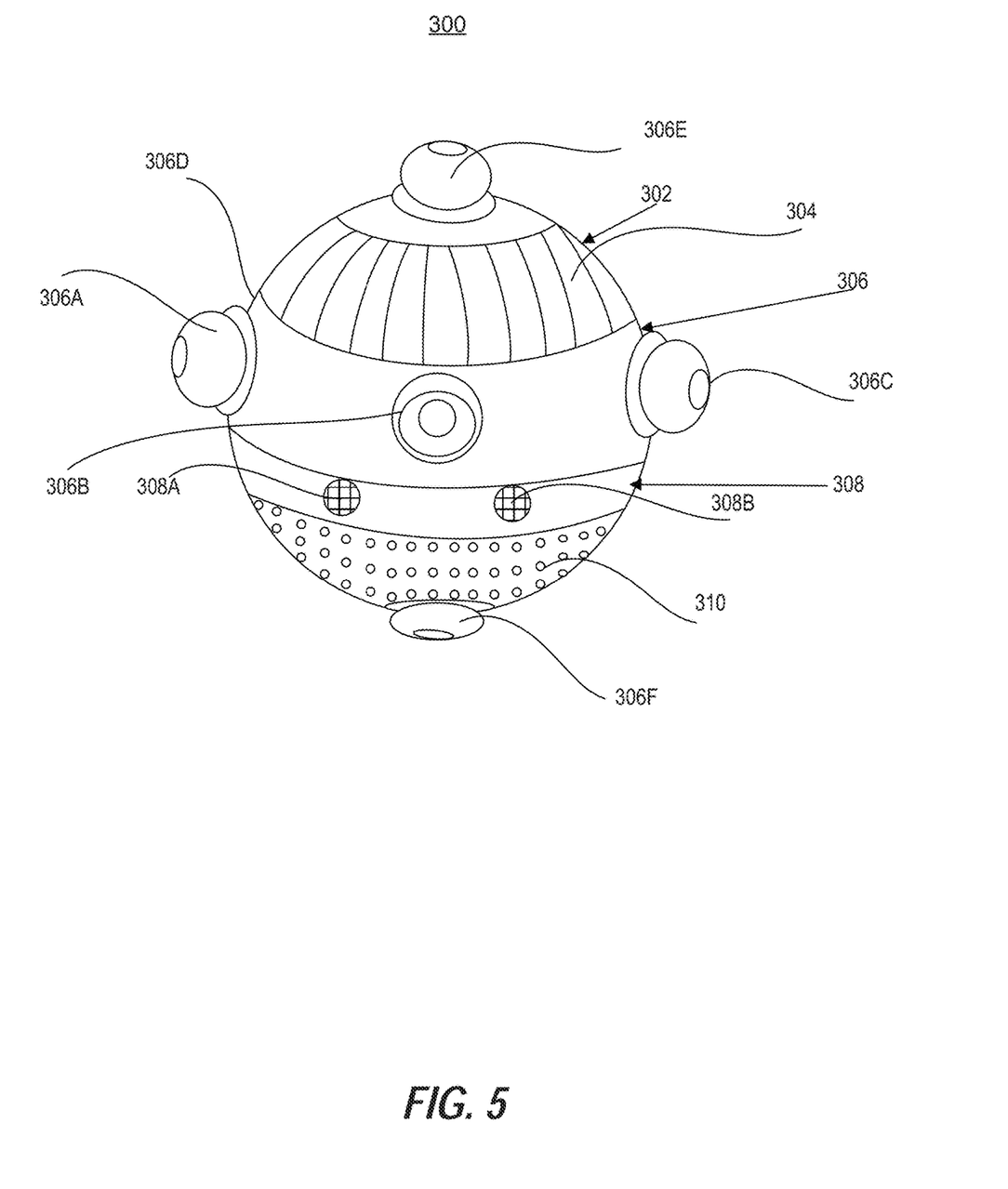
FIG. 5 is an exemplary perspective view of a spherical apparatus according to an embodiment of the present disclosure.

FIG. 5 is an exemplary perspective view of a spherical apparatus 300 consistent with embodiments of the present disclosure. Apparatus 300 has a spherical shape including a housing 302 having a circular cross section and curved surface. The spherical shape of apparatus 300 allows for multi-directional use. In some embodiments, a display 304 is configured to display video information in different directions based on information of an object sensed by one or more sensors included therein, e.g., one or more cameras and microphones. In some embodiments, apparatus 300 includes a camera array 306 including cameras 306A-F configured to provide a multi-directional view of the environment. Camera 306D is not visible in FIG. 5. In some embodiments, apparatus 300 includes a microphone array 308 including microphones 308A and 308B configured to provide sound/voice detection in the local environment and a direction of the detected voice. Microphone array may include microphones on the side of apparatus 300 not visible in FIG. 5, to provide multi-directional sound/voice detection. In some embodiments, apparatus 300 includes a speaker array 310 configured to be multi-directional and adjustable to play sound in different directions based on information of the local environment as sensed. In one embodiment, the spherical apparatus may be hung from the ceiling to capture images in multiple directions. By way of example, apparatus 300 may be placed in a vault to enable surveillance of precious goods. Cameras 306A-F may capture images in 360° vertical and horizontal directions of the vault. Upon entry by an intruder, speaker array 310 can generate an alarm output, display 304 can display real-time images of the intruder, and an associated processor can send a notification to emergency personnel.

Apparatus 300 can be configured to provide multi-directional detection of an environment. Since captured content can be multi-directional, audio and video data sensed by apparatus 300 can be viewed real-time by a remote user using a virtual reality device. Moreover, curved displays 204 of FIG. 3 and 304 can be configured to display virtual reality video data. Curved display 204 is suitable for displaying a wide-angle view or panoramic image. For example, curved display 204 can be configured to show a virtual tour of a city or play a movie. Apparatus 100 of FIG. 1, 200 of FIG. 3, and 300 are configured to capture, send, and receive multi-directional and virtual reality content.

Figure 6:
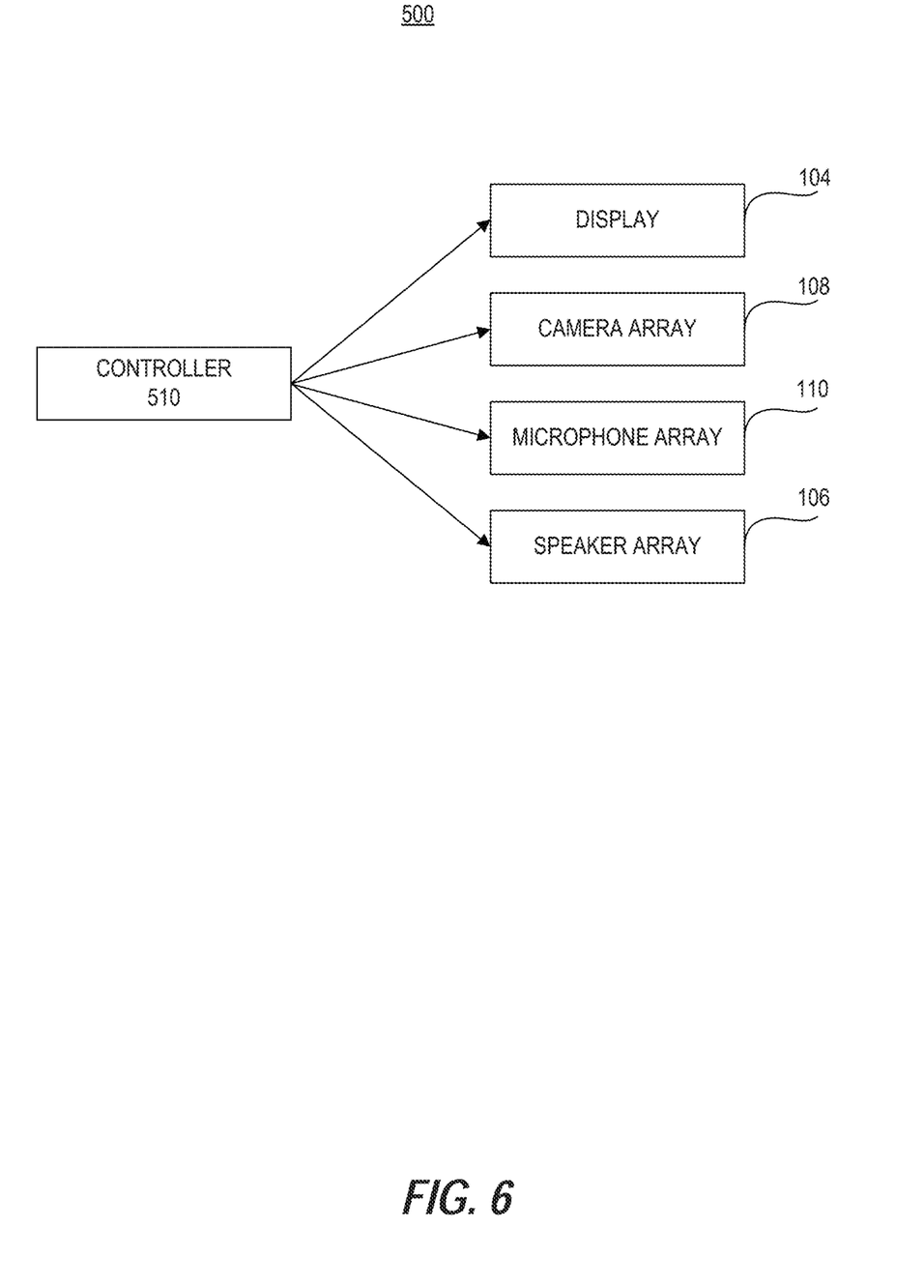
FIG. 6 is a block diagram of an exemplary system for synchronizing a plurality of elements, according to some embodiments.

FIG. 6 is a block diagram of an exemplary system, 500 for controlling and coordinating operation of the plurality of elements of apparatus 100 of FIGS. 1 and 2, apparatus 200 of FIGS. 3 and 4, or apparatus 300 of FIG. 5, according to some embodiments. System 500 includes a controller 510, for example, an electronic device, capable of controlling apparatus 100 of FIGS. 1 and 2 to perform certain operations. In particular, controller 510 may be configured to control the timing of operations of display 104, speaker array 106, camera array 108, and microphone array 110 of apparatus 100, in order to synchronize operations of some or all of these components of apparatus 100. In various embodiments, controller 510 may include a processor of local apparatus 100, a remote apparatus, a remote control, a mobile phone, a tablet computer, a personal computer, a personal digital assistant (PDA), an MP3 (Moving Picture Experts Group Audio Layer III) player, an MP4 player, etc. Controller 510 may be configured to form wireless and/or wired communications with each of the components of apparatus 100. Controller 510 may include a user interface through which a user can enter various commands and data. For example, the user may use the user interface to control some or all of the components of apparatus 100 to perform one or more operations simultaneously. For example, all of the components of apparatus 100 may be controlled by controller 510 to monitor a room as a security and surveillance system or to operate as a family care system.

In exemplary embodiments, controller 510 may generate and transmit a plurality of wireless signals. In one embodiment, controller 510 may periodically transmit the plurality of signals at a predetermined time interval. In another embodiment, controller 510 may transmit the plurality of signals non-periodically.

In exemplary embodiments, controller 510 may transmit the wireless signals in any suitable manner. In one embodiment, controller 510 may transmit the wireless signals via a local network that connects both controller 510 and local apparatus 100. In another embodiment, controller 510 may broadcast the wireless signals in certain broadcast channels, and apparatus 100 may scan for and receive the broadcast signals. In another embodiment, controller 510 may form a peer-to-peer (P2P) connection with apparatus 100 and transmit the wireless signals via the P2P connections.

In the context of this disclosure, synchronization does not necessarily mean all devices act at the same time; rather, the devices are synchronized if they act based on a common time reference or in a coordinated manner. Thus, in one aspect, apparatus 100 of FIGS. 1 and 2 receiving one wireless signal indicating a time delay may choose to activate one or more components at the time that is delayed from the current time by the amount of the time delay. Alternatively, apparatus 100 may choose to activate one or more components at another time based on the time delay indicated in the received wireless signal.

Figure 7:
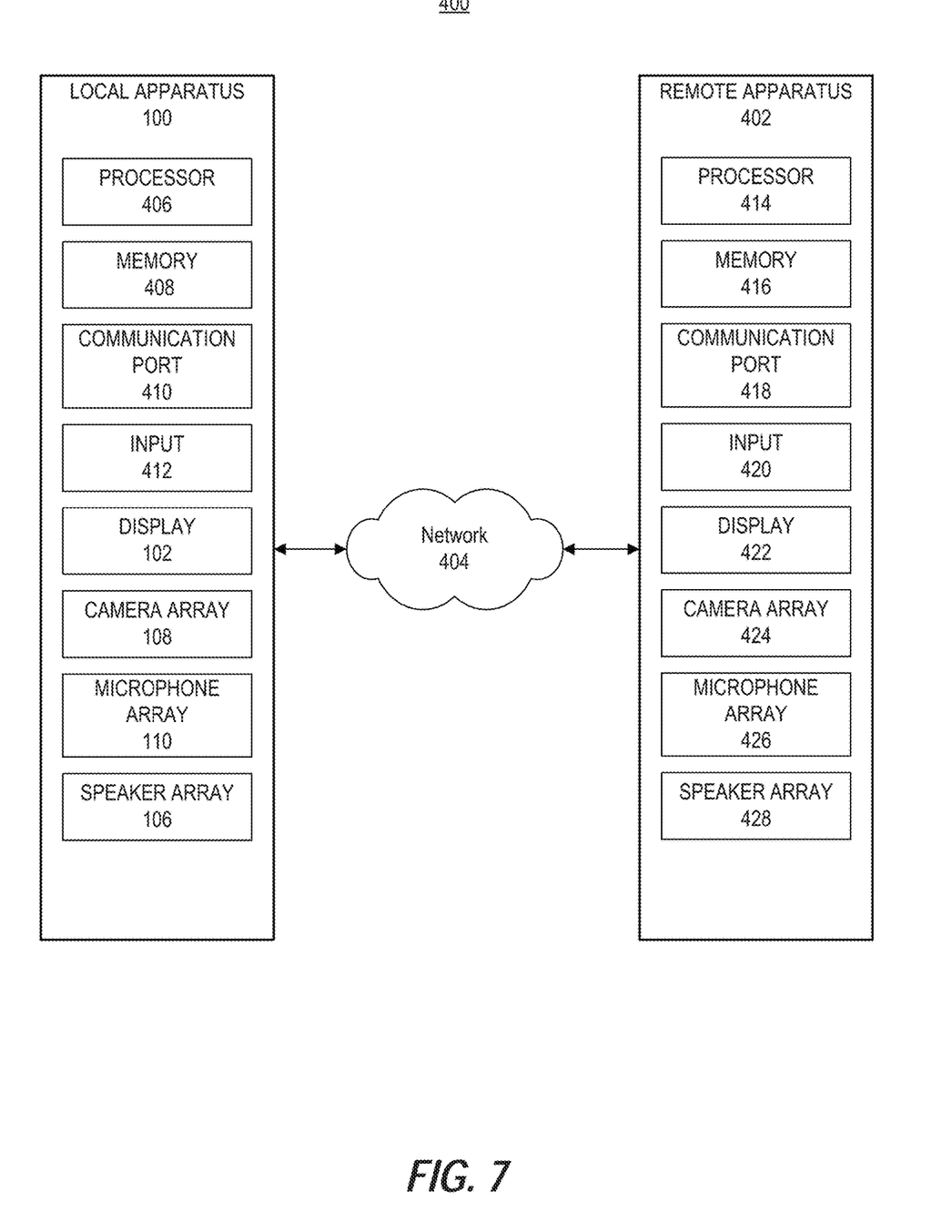
FIG. 7 is a block diagram of an exemplary system including two sensor systems connected through a network, according to an embodiment of the present disclosure.

FIG. 7 is a block diagram of an exemplary system 400 including apparatus 100 of FIG. 1 and a remote apparatus 402, connected through a network 404. As more fully described below, in system 400 processors execute instructions to receive and transmit audio and video data between local apparatus 100 and remote apparatus 402 over a wireless communication channel via network 404.

Local apparatus 100 includes a processor 406, a memory 408, a communication port 410, an input 412, display 104, camera array 108, microphone array 110, and speaker array 106. Remote apparatus 402 may include corresponding elements, for example, processor 414, memory 416, communication port 418, input 420, display 422, camera array 424, microphone array 426, speaker array 428. In operation, processor 406 executes instructions (program code) and performs functions in accordance with techniques described herein. The instructions include routines, programs, objects, components, data structures, procedures, modules, and functions, which cause processor 406 to perform particular functions described herein. For example, processor 406 receives and analyzes video captured by cameras of camera array 108. Processor 406 includes or is part of one or more known processing devices such as, for example, a microprocessor. In some embodiments, processor 406 includes any type of single or multi-core processor, mobile device microcontroller, central processing unit, etc. Processor 406 also controls display 104 to present video and/or images and speaker array 106 to emit audio data.

Memory 408 is configured to store one or more sets of instructions (program code) to be executed by processor 406 to perform exemplary methods disclosed herein. For example, memory 408 is configured to store instructions for execution by processor 406, to send to and receive video and audio data from remote apparatus 402. Remote apparatus 402 is any type of computing device. For example, remote apparatus 402 can be a smart phone, a tablet, a personal computer, a wearable device (e.g., Google Glass™ or smart watches, and/or affiliated components), or the like, or a combination thereof. In some embodiments, as for example illustrated in FIG. 7, remote apparatus 402 can include hardware and software elements corresponding to those of local apparatus 100.

Memory 408 is also configured to store data and/or parameters used by processor 406 in methods described in this disclosure. For example, memory 408 stores one or more sound and visual models for detecting an event included in a video. Processor 406 can access the sound and video model(s) stored in memory 408, and detect one or more events based on a sound or visual signal included in the video and the accessed sound or visual model(s) as described elsewhere herein. In some embodiments, memory 408 is configured to store one or more versions of video received from the cameras of camera array 108.

Memory 408 can include one or more of memories that are volatile or non-volatile, magnetic, semiconductor, tape, optical, removable, non-removable, or other type of storage device or tangible (i.e., non-transitory) computer-readable medium including, but not limited to, a ROM, a flash memory, a dynamic RAM, and a static RAM.

Communication port 410 is configured to transmit data to and receive data from, among other devices, remote apparatus 402 over network 404. Network 404 is any type of wired or wireless network that allows transmitting and receiving data. For example, network 404 is a wired network, a local wireless network, (e.g., Bluetooth™, WiFi, near field communications (NFC), etc.), a cellular network, the Internet, or the like, or a combination thereof. Other known communication methods which provide a medium for transmitting data between separate elements are also contemplated.

In some embodiments, cameras 108A-D of camera array 108 are also configured to transmit captured video (or different versions thereof) to processor 406, remote apparatus 402, and/or any user device via network 404. Additionally, processor 406 may also be configured to receive the video (or different versions thereof) from cameras 108A-D of camera array 108, remote apparatus 402, and/or any user device via network 404. Alternatively, cameras 108A-D may be configured to transmit a video stream to processor 406 and remote apparatus 402 in real time. Additionally, processor 406 and remote apparatus 402 may be configured to receive a video stream from cameras 108A-D in real time.

In some embodiments, camera array 108, microphone array 110, speaker array 106, processor 406, memory 408, communication port 410, and input 412 may be housed in a single device configured to perform functions of each element described in this disclosure. In some embodiments, processor 406 and memory 408 may be configured to perform one or more processes described in this disclosure. For example, camera array 108 may be configured to generate a video with a multidirectional, e.g., 360°, field of view and transmit the generated video to remote apparatus 402, as described elsewhere in this disclosure.

In some embodiments, cameras of camera array 108 capture video data coupled with audio data captured by microphones of microphone array 110. Processor 406 transmits the captured video and audio data to remote apparatus 402 wirelessly by network 404. By way of example, display 422 and speaker array 428 of remote apparatus 402 are controlled by processor 414 to present captured video and audio data received from local apparatus 100. In some embodiments, camera array 424 and microphone array 426 are controlled by processor 414 to capture video and audio data.

Local apparatus 100 is configured to receive real-time data (e.g., image and/or video data and audio data) from remote apparatus 402 via network 404. Local apparatus 100 is also configured to present images and/or videos received from remote apparatus 402 to the local user via display 104. Display 104 is any device configured to display, among other things, videos and/or images in display 104 based on the display data fed by processor 406.

Input 412 is configured to receive inputs from remote apparatus 402 and transmit data/signal relating to the received inputs to processor 406 for further processing.

Processor 406 is configured to execute software instructions to receive local audio data from microphone array 110 and local video data from the camera array 108. Processor 406 further generates local correlation information correlating local audio data from microphone array 110 with corresponding local video data from respective cameras of camera array 108, based on the fields of view of camera array 108 and the pick-up fields of the microphone array 110. Processor 406 also transmits local audio data, local video data, and local correlation information to remote apparatus 402. In addition, processor 406 generates a plurality of images on display 104 from remote video data and generates outputs by speaker array 106 corresponding to the displayed images, based on remote audio data and remote correlation information received from remote apparatus 402.

Memory 416 of remote apparatus 402 is configured to store one or more sets of instructions (program code) to be executed by processor 414 to perform exemplary methods disclosed herein. For example, memory 416 is configured to store instructions for execution by processor 414, to send to and receive video and audio data from local apparatus 100.

Communication port 418 of remote apparatus 402 is configured to transmit data to and receive data from, among other devices, local apparatus 100 over network 404.

Input 420 of remote apparatus 402 is configured to receive inputs from local apparatus 100 and transmit data/signal relating to the received inputs to processor 414 for further processing.

Figure 8:
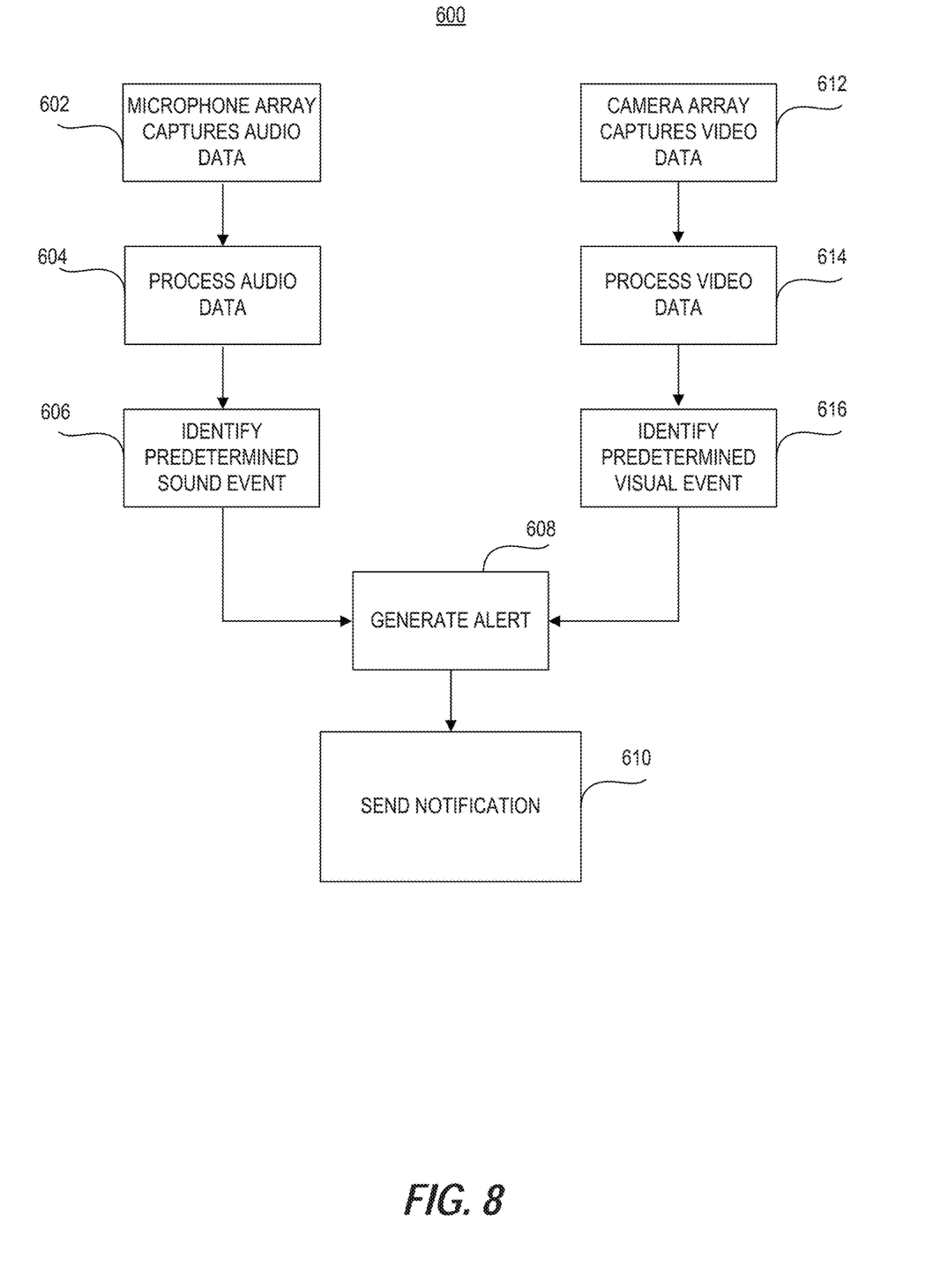
FIG. 8 is a flowchart of an exemplary process for identifying an event and generating an alert, according to some embodiments.

FIG. 8 is a flowchart of an exemplary process 600 for identifying a predetermined event and generating an alert, according to some embodiments. In some embodiments a sensor detects one or more objects in the environment and communicates information of the detected objects to a remote device. For example, the remote device can be a surveillance server, and the sensor can be included in apparatus 100. As illustrated in FIG. 8, at 602, microphones 110A-D of microphone array 110 serve as sensors to sense acoustic signals and generate audio data. At 604, processor 406 compares the generated audio data to sound models saved in memory 408. At 606, based on comparison between the generated audio data and the sound model, a predetermined sound event may be identified by processor 406. At 608, speakers 106A-D generate an output alert. At 610, processor 406 sends a notification. The notification may be sent to a specified telephone number, email address, or emergency personnel. In some embodiments, the system identifies a predetermined sound as a noise from a window shattering, an alarm system ringing, a baby crying, a person yelling for help, or any unusual sound in the room.

As illustrated in FIG. 8, at 612, cameras 108A-D serve as sensors to capture images and generate video data. At 614, processor 406 compares video data to visual models saved in memory 408. At 616, based on comparison between the video data and the visual model, a predetermined visual event may be identified. At 608, if the predetermined visual event has been identified, speakers 106A-D generate an output alert. At 610, processor 406 sends a notification. The notification may be sent to a specified telephone number, email address, or emergency personnel.

In some embodiments, cameras 108A-D and microphones 110A-D enable the system to provide a multidirectional view and sound detection, e.g., 360°, to follow a toddler's movement around a room and detect an accident or safety hazard. In some embodiments, the system may identify a predetermined visual event as an intruder entering, a fire, a person falling, or any unusual motion or foreign object in the room. In some embodiments, steps 602 through 610 (in identifying a predetermined sound event) and steps 612 through 610 (in identifying a predetermined visual event) are performed based on an exemplary process 700 shown in FIG. 9.

Figure 9:
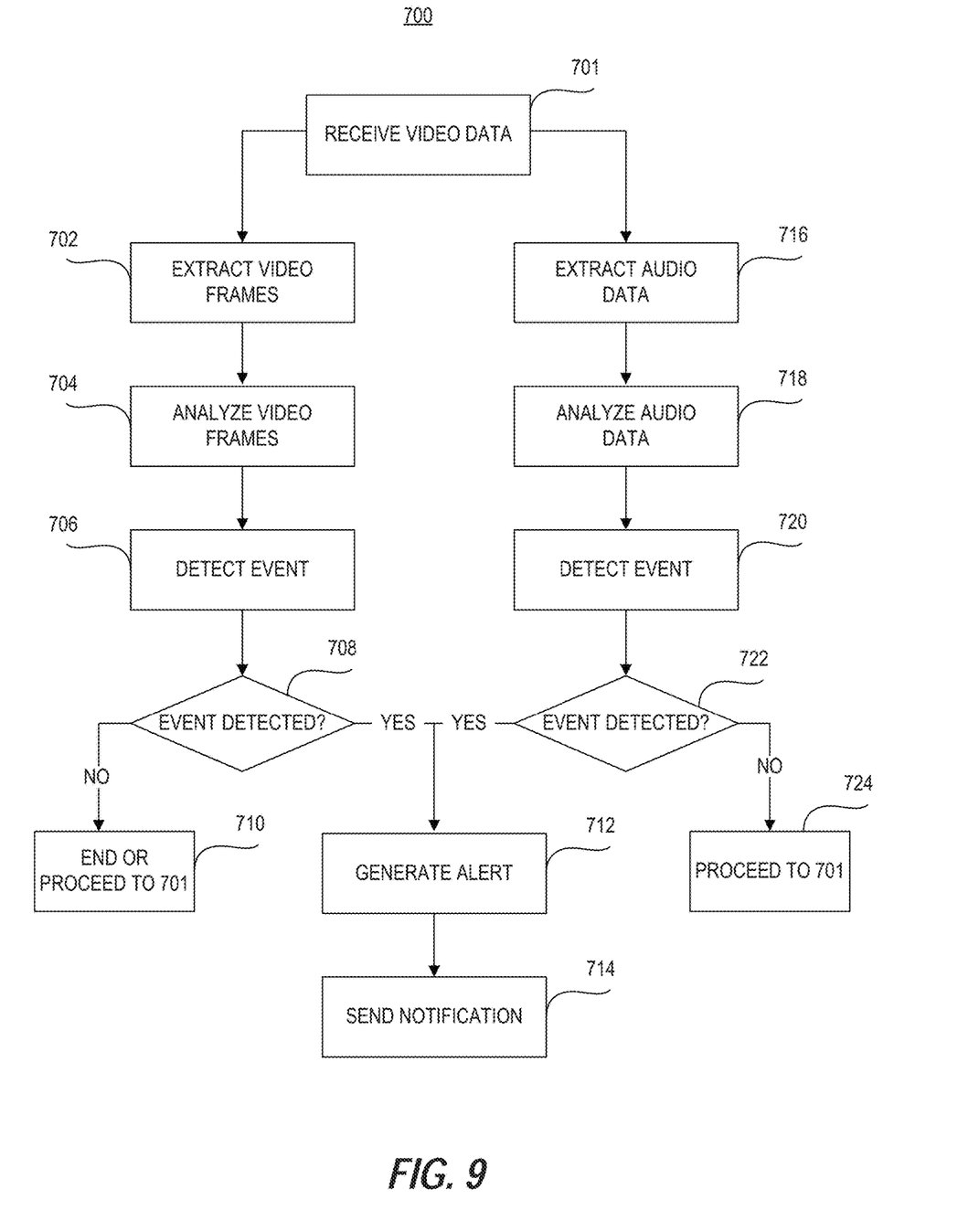
FIG. 9 is a flowchart of an exemplary process for obtaining information relating to one or more events and generating an alert, according to some embodiments.

As illustrated in FIG. 9, at 701, processor 406 receives video data, as described elsewhere in this disclosure. Processor 406 may detect one or more events based on video frames extracted from the video data. For example, in case of such detection, at 702, processor 406 extracts a plurality of video frames from the video data. In some embodiments, processor 406 extracts the video frames from the video data continuously. Alternatively, one video frame is extracted within a period of time. By way of example, processor 406 may extract one video frame from every second or every minute of the video data. In some embodiments, the rate of extracting video frames is adjustable. For example, initially one video frame is extracted for every minute of the video data. An event may be detected at some time point of the video data (e.g., a moving object is detected). From that detection time point on (and/or a certain period of time before the time point), the rate of extracting video frames increases to, for example, 30 frames per minute from the previous rate of one frame per minute. The rate decreases if no more events are subsequently detected within a period of time. For example, the rate decreases back to one frame per minute if the moving object previously detected is not included in the video data within, for example, 10 minutes.

Processor 406 analyzes the extracted video frames at 704. For example, processor 406 analyzes the video frames to identify an object included in the images. Processor 406, at 706, may detect one or more events based on analysis of the video frames. Exemplary events to be detected may include a motion event (e.g., a moving object is detected), an object recognition (e.g., a criminal suspect is recognized), event recognition (e.g., a baby stands up in crib), an emergency event (e.g., a fire incidence is detected), etc. For example, processor 406 detects a motion event included in video data by determining a difference in pixel values of a video frame and those of a preceding video frame. If the difference exceeds a threshold, a motion event is identified. Alternatively, as shown in FIG. 8, captured video data may be compared to visual models stored in the memory. Based on the comparison, a predetermined visual event may be identified.

At 708, processor 406 determines whether any event is detected. If no event is detected (708—NO), at 710, process 700 either ends or, alternatively, proceeds to 701, and an event may be detected based on analysis of the data associated with the video (steps 716 through 722), as described below. Additionally or alternatively, processor may determine whether any event is detected by simultaneously analyzing video data and audio data or by analyzing data in any order.

On the other hand, if one or more events are detected (708—YES), at 712, processor 406 generates an alert, for example, an output from speakers 106A-D. Processor 406 also identifies one or more video frames associated with the identified event. At 714, processor 406 sends a notification to a specified telephone number, email address, or emergency personnel. In some embodiments, processor 406 may obtain information relating to the identified event(s) and/or information relating to the identified video frame(s) associated with the event(s). For example, processor 406 may obtain a time stamp (e.g., the starting time of the event) and/or a time window (e.g., the starting time and ending time of the event) for the detected event. Processor 406 may also obtain starting and ending points of the event. In some embodiments, processor 406 further identifies the video frames associated with the detected event (e.g., the video frames during the event, and within a period of time before and/or after the event). The obtained information may be communicated wirelessly to remote apparatus 402 via network 404.

For example, in case of such detection, at 716, processor 406 extracts a plurality of audio frames from the audio data. In some embodiments, processor 406 extracts the audio frames from the audio data continuously. Alternatively, one audio frame is extracted within a period of time. By way of example, processor 406 may extract one audio frame from every second or every minute of the audio data. In some embodiments, the rate of extracting audio frames is adjustable. For example, initially one audio frame is extracted for every minute of the audio data. An event may be detected at some time point of the audio data (e.g., a sound is detected). From that detection time point on (and/or a certain period of time before the time point), the rate of extracting audio frames increases to, for example, 30 frames per minute from the previous rate of one frame per minute. The rate decreases if no more events are subsequently detected within a period of time. For example, the rate decreases back to one frame per minute if the sound previously detected is not included in the audio data within, for example, 10 minutes. Processor 406 analyzes the extracted audio frames at 718. For example, processor 406 analyzes the audio frames to identify a sound.

Processor 406, at 720, detects one or more events based on the analysis of the audio data. For example, processor 406 may detect a break-in event based on the detected sound of shattering glass (e.g., a window) in the audio data. At 722, processor 406 determines whether there is any event detected. If no event is detected (722—NO), at 724, process 700 either ends, or alternatively, proceeds to 701, and an event can be detected based on analysis of video frames of the video data (steps 702 through 708), as described above. Moreover, processor 406 may determine whether any event is detected by simultaneously analyzing video data and audio data or by analyzing data in any order. By way of example, processor 406 may determine whether there is any speech or any particular sound (e.g., laughter, crying, screaming, applause, glass shattering, etc.) included in the audio data.

On the other hand, if one or more events are detected (722—YES), processor 406, at 712, generates an alert. At 714, processor 406 sends a notification. For example, the notification may be sent to a specified telephone number, email address, or emergency personnel. In some embodiments, a detected event based on the analysis of video frames is cross-referenced with the audio data of the video data to confirm the detected event, and vice versa.

Figure 10:
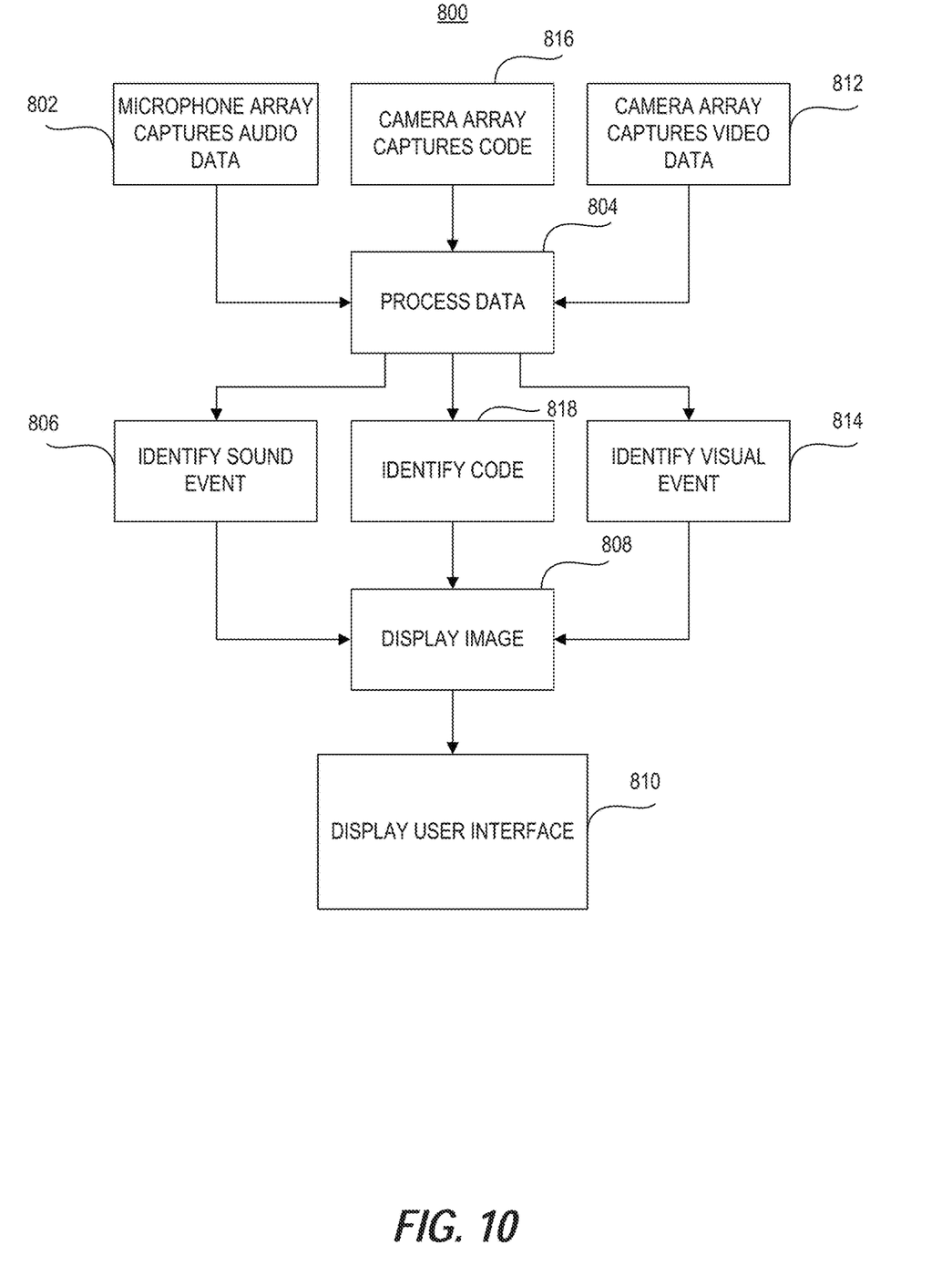
FIG. 10 is a flowchart of an exemplary process for identifying events and displaying an image and user interface, according to some embodiments.

FIG. 10 is a flowchart of an exemplary process 800 for identifying events and displaying a product on a user interface. The term "product" as used herein refers to anything that can be offered for sale to a market that might satisfy a want or need, e.g. a gadget or clothing. As illustrated in FIG. 10, at 802, microphones 110A-D sense acoustic signals and generate audio data. At 804, processor 406 compares the generated audio data to sound models saved in memory 408. At 806, based on comparison between the audio data and the sound model, a sound event may be identified. At 808, display 104 displays an image based on the sound event identified in 806. At 810, display 104 displays a user interface.

As illustrated in FIG. 10, at 812, cameras 108A-D capture images and generate video data. At 804, processor 406 compares generated video data to visual models saved in memory 408. At 814, based on comparison between the video data and the visual model, a visual event may be identified. At 808, display 104 displays an image based on the visual event identified in 814. At 810, display 104 displays a user interface.

As further illustrated in FIG. 10, at 816, cameras 108A-D capture images of a one-dimensional or two-dimensional code and generate image data. The term "code" as used herein refers to any machine-readable optical label that contains information about an item to which it is attached, e.g. a matrix barcode, a Quick Response (QR) code. At 804, processor 406 compares the generated image data to visual models saved in memory 408. At 818, based on comparison between the image data and the visual model, a code may be identified. At 808, display 104 displays an image based on the code identified in 818 via network 404. At 810, display 104 displays a user interface.

In other embodiments, apparatus 100 detects one or more objects in the environment and communicates the information of the detected objects to a remote device. The remote device can be a vendor system that permits placement of an order for products based on the sensed information. In some embodiments, a sound event may consist of a command, for example, a command to search for a specified product. As another example, apparatus 100 recognizes a gesture performed by the user, the it may switch to an online shopping mode and receive user input regarding the shopping needs. In some embodiments, apparatus 100 may identify a product from QR code and display the product on display 104 via network 404. The system may display a user interface to purchase the product or search similar products.

In some embodiments, cameras 108A-D may be configured to capture an image of a real product and processor 406 identifies the product. Display 104 may present a user interface for the user to reorder the product or automatically search for online vendors of the same product or present search results for similar products.

While illustrative embodiments have been described herein, the scope of any and all embodiments have equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed processes may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. Apparatus, comprising:
a sensor for sensing an environment of the apparatus, wherein the sensor includes a camera array configured to generate a video with a 360° field of view;
a speaker; and
multiple displays capable of displaying video information in multiple directions, wherein the multiple displays are configured to display video information in different directions based on information of an object sensed by the sensor, and the speaker is configured to generate in multiple directions sound associated with the video information, wherein the multiple displays wrap around the apparatus, and each of the multiple displays presents the same image.

2. The apparatus of claim 1, wherein the apparatus has a cylindrical or spherical shape.

3. The apparatus of claim 1, wherein the sensor comprises an audio detector, a visual detector, or both.

4. The apparatus of claim 3, wherein the sensor includes a microphone that detects voice in the environment and a direction of the voice.

5. The apparatus of claim 3, wherein the sensor includes a microphone array arranged around the apparatus.

6. The apparatus of claim 1, wherein the sensor is configured to sense a person in the environment.

7. The apparatus of claim 6, wherein the sensor is configured to sense information of the sensed person including voice, location relative to the apparatus, commands, touches, and/or gesture of the person.

8. The apparatus of claim 1, wherein the speaker is multi-directional and can adjust play of sound in different directions based on the sensed information of the environment.

9. The apparatus of claim 1, wherein the apparatus is a conferencing apparatus, and the multiple displays are configured to display information of a remote conference participant.

10. The apparatus of claim 9, wherein the multiple displays are configured to display information of the other participant in the direction of a local user of the apparatus.

11. The apparatus of claim 10, wherein the information of the remote participant includes an image of the remote participant, the remote participant's location, or video data that the remote participant shares with the local user.

12. The apparatus of claim 1, wherein the apparatus is a virtual reality device, and the sensor detects one or more objects in the environment and communicates sensed information of the detected objects to a remote device.

13. The apparatus of claim 12, wherein the remote device is a surveillance server.

14. The apparatus of claim 12, wherein the remote device is a vendor system that permits placement of an order for products based on the sensed information.

15. A method, comprising:
sensing an environment by a sensor, wherein the sensor includes a camera array configured to generate a video with a 360° field of view;
generating an output by a speaker; and
displaying video information in multiple directions by multiple displays, wherein the multiple displays are configured to display video information in different directions based on information of an object sensed by the sensor, and the speaker generates in multiple directions sound associated with the video information, wherein the multiple displays wrap around the apparatus, and each of the multiple displays presents the same image.

16. The method of claim 15, further comprising detecting voice in the environment and a direction of the voice.

17. The method of claim 15, further comprising sensing a multi-directional image of the environment.

18. The method of claim 15, further comprising sensing a person in the environment by the sensor.

19. The method of claim 18, wherein the sensor senses information of the person including voice, location relative to the sensor, commands, touches, and/or gesture of the person.

20. The method of claim 15, wherein the speaker is multi-directional and can adjust play of sound in different directions based on the information of the environment sensed by the sensor.

21. The method of claim 18, further comprising displaying information of a remote participant.

22. The method of claim 21, wherein the information of the remote participant is presented in the direction of the person in the environment.

23. The method of claim 21, wherein the information of the remote participant includes an image of the remote participant, the remote participant's location, or video data that the remote participant shares with the person.

24. The method of claim 15, further comprising:
detecting one or more objects in the environment; and
communicating the information of the one or more detected objects to a remote device.

25. The method of claim 24, wherein the remote device is a surveillance server.

26. The method of claim 24, wherein the remote device is a vendor system that permits placement of an order for products based on the communicated information.

27. A non-transitory computer-readable medium storing instructions that are executable, the instructions being configured to cause a processor to:
sense an environment by a sensor, wherein the sensor includes a camera array arranged configured to generate a video with a 360° field of view;
generate an output by a speaker; and
display video information in multiple directions by multiple displays, wherein the multiple displays are configured to display video information in different directions based on information of an object sensed by the sensor, and the speaker generates in multiple directions sound associated with the video information, wherein the multiple displays wrap around the apparatus, and each of the multiple displays presents the same image.

* * * * *